(12) United States Patent
Ponna

(10) Patent No.: US 7,970,877 B1
(45) Date of Patent: *Jun. 28, 2011

(54) SYSTEM AND METHOD FOR INTERFACING WITH A COMPONENT LOCATED IN A NETWORK ENVIRONMENT

(75) Inventor: Rajesh Ponna, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1469 days.

This patent is subject to a terminal disclaimer.

(21) Appl. No.: 10/703,744

(22) Filed: Nov. 7, 2003

Related U.S. Application Data

(63) Continuation of application No. 09/087,383, filed on May 29, 1998, now Pat. No. 6,735,625.

(51) Int. Cl.
*G06F 9/44* (2006.01)
*G06F 15/177* (2006.01)
*G06F 15/173* (2006.01)

(52) U.S. Cl. .................. 709/223; 709/221; 717/171

(58) Field of Classification Search .......... 709/220–224; 717/171–178
See application file for complete search history.

(56) References Cited

U.S. PATENT DOCUMENTS

| | | | | |
|---|---|---|---|---|
| 5,396,587 A | | 3/1995 | Reed et al. ............... 707/503 |
| 5,421,009 A | * | 5/1995 | Platt ............... 709/221 |
| 5,555,416 A | | 9/1996 | Owens et al. ............ 717/11 |
| 5,564,051 A | | 10/1996 | Halliwell et al. .......... 707/200 |
| 5,613,160 A | | 3/1997 | Kraslavsky et al. ......... 710/16 |
| 5,623,604 A | * | 4/1997 | Russell et al. .......... 717/167 |
| 5,630,066 A | | 5/1997 | Gosling ............ 709/221 |
| 5,717,930 A | | 2/1998 | Imai et al. ............... 395/712 |
| 5,742,829 A | | 4/1998 | Davis et al. .............. 395/712 |
| 5,758,342 A | | 5/1998 | Gregerson ................. 707/10 |
| 5,764,992 A | | 6/1998 | Kullick et al. ............. 395/712 |
| 5,793,979 A | | 8/1998 | Lichtman et al. ......... 395/200.56 |
| 5,794,052 A | | 8/1998 | Harding .................. 395/712 |
| 5,809,251 A | * | 9/1998 | May et al. ................ 709/223 |
| 5,826,090 A | | 10/1998 | Mealey et al. ............. 717/11 |
| 5,832,275 A | * | 11/1998 | Olds ...................... 717/173 |
| 5,835,911 A | | 11/1998 | Nakagawa et al. ........ 707/203 |
| 5,842,024 A | | 11/1998 | Choye et al. ............. 395/712 |
| 5,905,896 A | * | 5/1999 | Delannoy ................. 717/170 |
| 5,919,247 A | | 7/1999 | Van Hoff et al. ........... 709/217 |
| 5,951,639 A | | 9/1999 | MacInnis ................. 709/217 |

(Continued)

OTHER PUBLICATIONS

"Manpage of SNMPGET", Feb. 8, 2002, Web Page, Retreived from http://www.net-snmp.org/docs/man/snmpget.html on Nov. 10, 2009.*

(Continued)

*Primary Examiner* — Aaron Strange
(74) *Attorney, Agent, or Firm* — Baker Botts L.L.P.

(57) ABSTRACT

According to an embodiment of the present invention, a user in a network environment can connect to a device on the network and automatically learn at least one detail regarding the device software image details. Examples of the software image details may include software version number, size in bytes, device model/family name, software filename, interface hardware details, and supported software feature set such as Internet Protocol (IP), Internet Packet Exchange (IPX), and AppleTalk. Additionally, an embodiment of the present invention may determine if the software image version or feature set is supported by a product which the user desires to use, suggest an upgrade to an appropriate software version or feature set to accommodate the product if the current version is not supported by the product, and automatically upgrade the software if the user approves of such action.

26 Claims, 4 Drawing Sheets

U.S. PATENT DOCUMENTS

| | | | | |
|---|---|---|---|---|
| 5,954,797 A * | 9/1999 | Sidey | | 709/223 |
| 5,963,939 A | 10/1999 | McCann et al. | | 707/4 |
| 5,978,590 A | 11/1999 | Imai et al. | | 717/11 |
| 5,978,911 A | 11/1999 | Knox et al. | | 713/1 |
| 5,991,543 A | 11/1999 | Amberg et al. | | 395/712 |
| 5,991,544 A | 11/1999 | Godse | | 395/712 |
| 5,995,757 A | 11/1999 | Amberg et al. | | 395/712 |
| 6,006,034 A | 12/1999 | Heath et al. | | 717/11 |
| 6,009,274 A * | 12/1999 | Fletcher et al. | | 717/173 |
| 6,012,100 A | 1/2000 | Frailong et al. | | 709/250 |
| 6,029,196 A | 2/2000 | Lenz | | 709/221 |
| 6,041,183 A * | 3/2000 | Hayafune et al. | | 717/173 |
| 6,058,418 A | 5/2000 | Kobata | | 709/221 |
| 6,067,582 A | 5/2000 | Smith et al. | | 710/5 |
| 6,075,943 A | 6/2000 | Feinman | | 395/712 |
| 6,078,951 A | 6/2000 | Pashupathy et al. | | 709/217 |
| 6,104,868 A * | 8/2000 | Peters et al. | | 709/202 |
| 6,110,228 A * | 8/2000 | Albright et al. | | 717/178 |
| 6,122,639 A * | 9/2000 | Babu et al. | | 707/103 R |
| 6,128,016 A * | 10/2000 | Coelho et al. | | 715/808 |
| 6,199,204 B1 | 3/2001 | Donohue | | 717/178 |
| 6,219,698 B1 * | 4/2001 | Iannucci et al. | | 709/221 |
| 6,219,718 B1 | 4/2001 | Villalpando | | 709/317 |
| 6,247,128 B1 | 6/2001 | Fisher et al. | | 713/100 |
| 6,256,668 B1 | 7/2001 | Slivka et al. | | 709/220 |
| 6,266,809 B1 * | 7/2001 | Craig et al. | | 717/173 |
| 6,282,712 B1 | 8/2001 | Davis et al. | | 717/11 |
| 6,314,565 B1 * | 11/2001 | Kenner et al. | | 717/171 |
| 6,345,300 B1 | 2/2002 | Bakshi et al. | | 709/229 |
| 6,374,293 B1 | 4/2002 | Dev et al. | | 709/220 |
| 6,594,737 B2 * | 7/2003 | Niwa et al. | | 711/154 |

OTHER PUBLICATIONS

Sant'Angelo et al., Windows NT Server Survival guide, SAMS Publishing, pp. 508-528, 1996.

Scott Kronick, Netwcape Navigator Handbook, Netscape Communications Corporation, 1994, pp. 16-17.

* cited by examiner

SYSTEM AND METHOD FOR INTERFACING WITH A COMPONENT LOCATED IN A NETWORK ENVIRONMENT

CROSS-REFERENCE TO RELATED APPLICATION

This is a continuation application that claims priority to non-provisional application Ser. No. 09/087,383 filed May 29, 1998 now U.S. Pat. No. 6,735,625.

TECHNICAL FIELD OF THE INVENTION

The present invention relates generally to components located in a network environment. More particularly, the present invention relates to a system and method for interfacing with a component, such as a device or a piece of software, in a network environment.

BACKGROUND OF THE INVENTION

Modern computer networks may consist of thousands of computing devices of various kinds, often made by different vendors and interconnected by many types of transmission media, including standard telephone lines, satellites, digital microwave radio, optical fibers, or digital data lines. They may include local or wide area configurations. For such a group of heterogeneous devices to be linked, either the hardware and software need to be compatible or else complex interfaces need to be built to allow meaningful communication to take place.

A computer network consists of a set of communication channels interconnecting a set of computing devices or nodes that can communicate with each other. The nodes may be computers, terminals, work stations, or communication units of various kinds distributed over different locations. They communicate over communication channels that can be leased from common carriers (e.g. telephone companies) or are provided by the owners of the network. These channels may use a variety of transmission media, including optical fibers, coaxial cable, twisted copper pairs, satellite links, or digital microwave radio. The nodes may be distributed over a wide area (distances of hundreds or thousands of miles) or over a local area (distances of a hundred feet to several miles), in which case the network are called wide area (WAN) or local area (LAN) networks, respectfully. Combinations of LANs and WANs are also possible in the case of widely separated LANs in branch offices connected via a WAN to the LAN in corporate headquarters.

Over the past decade, modern computer networks have greatly increased in number and geographical area, in the number and variety of devices interconnected, and in the scope of the applications supported. A modern network may consists of thousands of computing devices made by various manufacturers connected by a variety of transmission media spanning international and intercontinental boundaries.

For example, a single network can include a node in California as well as a node in New York. If a network administrator in California wishes to inventory all of the devices and software located in New York, the California network administrator would typically need to contact a network administrator located in New York to obtain the required details. Although the network administrator in California may already be aware of the existence of a device in the New York portion of the network, the California network administrator may not be aware of details related to that device, such as the model of the device, the type of the device, hardware components information including vendor specific part number, the version of the software running on the device, software feature set, software location, and the size in bytes of the software. This type of information may be needed by the California network administrator for inventory purposes.

Another situation in which a user, such as a network administrator, may need to know details of a particular device or a particular piece of software within the network may be when the user wishes to use a product in conjunction with a piece of software or device located in a different location from the user. For example, if the California network administrator wishes to utilize a product in conjunction with a device located in New York, then the California network administrator would typically need to call the New York network administrator to determine whether the product can support the device or feature set.

If the California network administrator determines that the product that he wishes to use does not support the current version of the software in the New York device, then the California network administrator would typically need to determine which software version would be compatible with the product he wishes to use. Typically this information can be found in a manual associated with the product. Once the software version is determined, then the California network administrator can load the new software version on to the device located in New York.

It would be desirable to be able to automatically learn various details related to a particular device or piece of software. Additionally it would also be desirable to automatically determine if a product supports the device or feature set of the device. If the device or feature set is not compatible with the product, then it would be desirable to be able to automatically locate a software version which would be compatible with the product and automatically load it on to the device. The present invention addresses such a need.

SUMMARY OF THE INVENTION

The present invention provides a system and method for interfacing with a component located in a network environment. A component is herein meant to include, but is not limited to, a device, a combination of devices, a piece of software, or a combination of pieces of software. According to an embodiment of the present invention, a user in a network environment can connect to a device on the network and automatically learn at least one detail regarding the device hardware and software image details. Examples of the software image details may include software version number, size in bytes, software filename, and supported software feature set such as Internet Protocol (IP), Internet Packet eXchange (IPX), and AppleTalk. Examples of hardware details may include device model, family name, device type, network modules, WAN interface cards, voice interface cards, and interface details. Additionally, an embodiment of the present invention may determine if the software image version or feature set is supported by a product which the user desires to use, suggest an upgrade to an appropriate software version or feature set to support the product if the current version is not supported by the product, and automatically upgrade the software if the user approves of such action.

A method according to an embodiment of the present invention for interfacing with a component located in a network environment is presented. The method comprising identifying a component located in a network environment; coupling with the component; and automatically learning at least one detail related to the component.

In another aspect of the invention, a method according to an embodiment of the present invention for interfacing with a component located in a network environment is presented. The method comprising identifying a component located in a network environment; automatically learning from the component at least one detail related to the component; and displaying the learned at least one detail related to the component.

DETAILED DESCRIPTION OF THE INVENTION

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
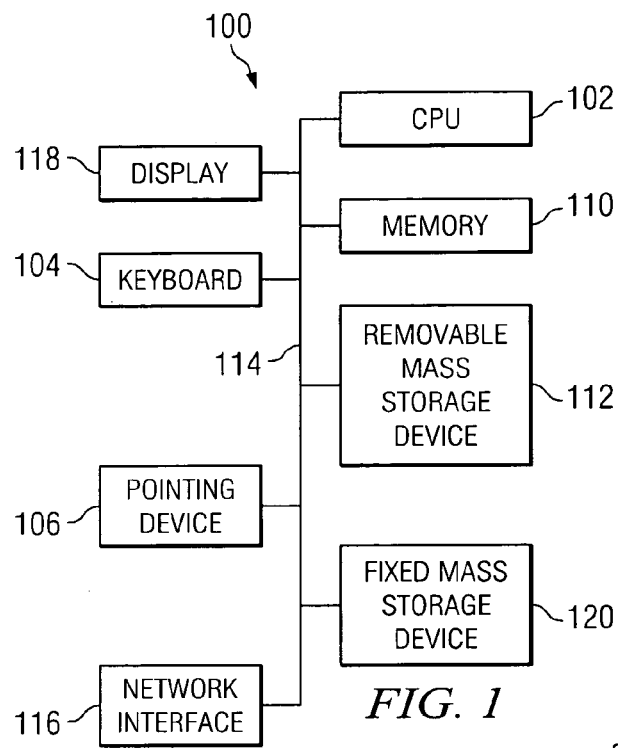
FIG. 1 is a block diagram of a computer system suitable for implementing the present invention.

FIG. 1 is a block diagram of a general purpose computer system 100 suitable for carrying out the processing in accordance with one embodiment of the present invention. FIG. 1 illustrates one embodiment of a general purpose computer system. Other computer system architectures and configurations can be used for carrying out the processing of the present invention. Computer system 100, made up of various subsystems described below, includes at least one microprocessor subsystem (also referred to as a central processing unit, or CPU) 102. That is, CPU 102 can be implemented by a single-chip processor or by multiple processors. CPU 102 is a general purpose digital processor which controls the operation of the computer system 100. Using instructions retrieved from memory 110, the CPU 102 controls the reception and manipulation of input data, and the output and display of data on output devices.

CPU 102 is coupled bi-directionally with memory 110 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 102. Also as well known in the art, primary storage typically includes basic operating instructions, program code, data and objects used by the CPU 102 to perform its functions. Primary storage devices 110 may include any suitable computer-readable storage media, described below, depending on whether, for example, data access needs to be bi-directional or uni-directional. CPU 102 can also directly and very rapidly retrieve and store frequently needed data in a cache memory (not shown).

A removable mass storage device 112 provides additional data storage capacity for the computer system 100, and is coupled either bi-directionally or uni-directionally to CPU 102. For example, a specific removable mass storage device commonly known as a CD-ROM typically passes data uni-directionally to the CPU 102, whereas a floppy disk can pass data bi-directionally to the CPU 102. Storage 112 may also include computer-readable media such as magnetic tape, flash memory, signals embodied on a carrier wave, PC-CARDS, portable mass storage devices, holographic storage devices, and other storage devices. A fixed mass storage 120 can also provide additional data storage capacity. The most common example of mass storage 120 is a hard disk drive. Mass storage 112, 120 generally store additional programming instructions, data, and the like that typically are not in active use by the CPU 102. It will be appreciated that the information retained within mass storage 112, 120 may be incorporated, if needed, in standard fashion as part of primary storage 110 (e.g. RAM) as virtual memory.

In addition to providing CPU 102 access to storage subsystems, bus 114 can be used to provide access other subsystems and devices as well. In the described embodiment, these can include a display monitor 118, a network interface 116, a keyboard 104, and a pointing device 106, as well as an auxiliary input/output device interface, a sound card, speakers, and other subsystems as needed. The pointing device 106 may be a mouse, stylus, track ball, or tablet, and is useful for interacting with a graphical user interface.

The network interface 116 allows CPU 102 to be coupled to another computer, computer network, or telecommunications network using a network connection as shown. Through the network interface 116, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 116.

An auxiliary I/O device interface (not shown) can be used in conjunction with computer system 100. The auxiliary I/O device interface can include general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, bus 114 is illustrative of any interconnection scheme serving to link the subsystems. The computer system shown in FIG. 1 is but an example of a computer system suitable for use with the invention. Other computer architectures having different configurations of subsystems may also be utilized.

Figure 2:
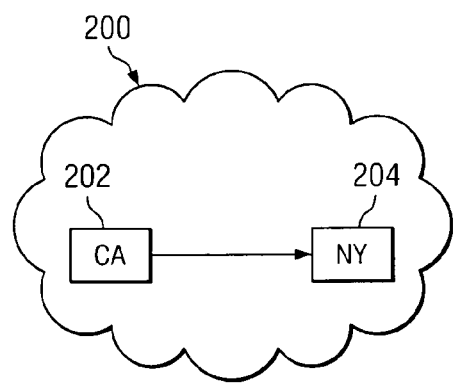
FIG. 2 is an illustration of a network encompassing various locations, such as California and New York.

FIG. 2 is a block diagram of an example of a network 200 which includes a location in California 202, and a location in New York 204. In this example, it can be assumed that a user, such as a network administrator, is located in California 202, while a device which is desired to be used by the user is located somewhere in the network 200 in New York 204. Embodiments of the present invention may be implemented in conjunction with such a network system.

Figures 3A, 3B:
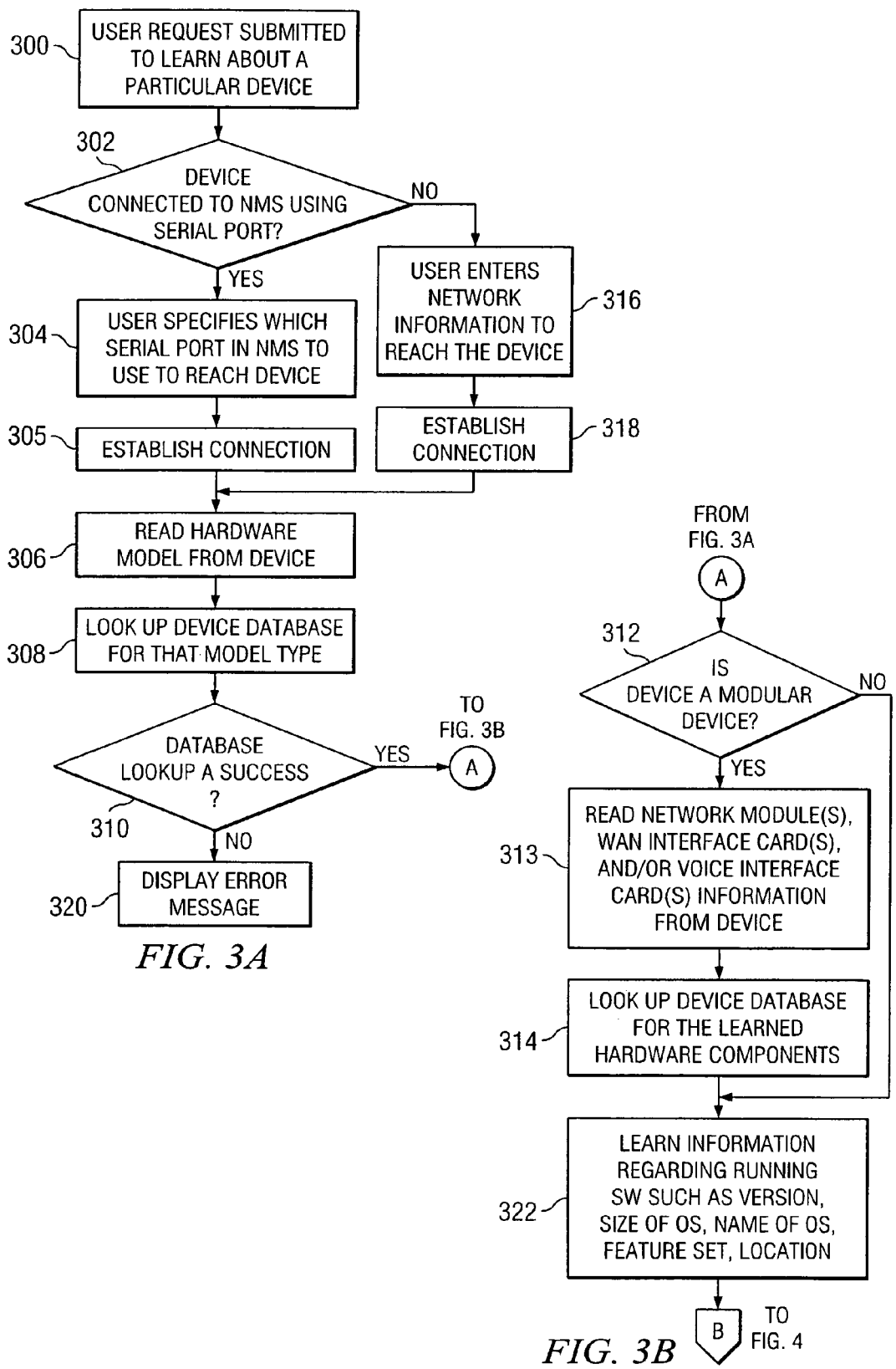
FIGS. 3A-3B are flow diagrams of a method according to an embodiment of the present invention for interfacing with a component located in a network environment.

FIGS. 3A-3B are flow diagrams of a method according to an embodiment of the present invention for interfacing with a component located in a network environment. As previously stated, a component is herein meant to include, but is not limited to, a device, a combination of devices, a piece of software, or a combination of pieces of software. The flow diagrams disclosed herein are merely examples of an embodiment according to the present invention. It should be noted that the same or similar objectives can be achieved in various manners, for example, the order of many of the steps shown in the flow diagram can be reorganized and yet achieve the same objective.

A user request is submitted to learn about a particular device, via step 300. It is then determined whether the device is connected to a network management system (NMS) using a serial port, via step 302. A network management system is a computer system utilizing a method according to an embodiment of the present invention for interfacing with a component located in a network environment. FIG. 1 shows an example of such a computer system. If the device is not connected to the NMS using a serial port, then the user enters network information to reach the device, via step 316. For example, if the device is connected to NMS via a network connection, then the user may enter the network address of the device. Connection is then established to the device, via step 318. Thereafter, the model of the device is read from the device, via step 306.

If the device is connected to NMS via a serial port, via step 302, then the user may specify which serial port the device is connected in the NMS to use to reach the device, via step 304. Connection is then established, via step 305. The hardware model of the device is then read from the device, via step 306. A device data base is then accessed for a model type corresponding to the model of the device, via step 308.

The device database is a database which includes various information related to devices in the network environment. The device database may include information such as device type information, device family information, hardware interface information, wide area network (WAN)/voice interface card (VIC) interface card information, network module information, fixed device information, modular device information, and stacks information.

Device type information may include information regarding all possible device types within the network, such as routers, switches, servers, FIFO devices, and stacks. Stacks, as referred to herein, indicate a set of devices which are physically combined together, for instance a stack may include a set of devices which are combined together such that a device sits on top of another device. Device type information may also include the device type and label. Since the device type may simply be a number, the label can identify the device type to a user. For example, the device type may actually be Cisco 1003, whereas the label may indicate that the device is a router.

Device family information may include information regarding all device families which belong to each device type in the network environment. The device family information may also include the family, the device type, and the label. For example, Cisco 1000 router family may include several models, such as 1003, 1004, 1005. The device family is Cisco 1000 series, and the device type is a router.

The hardware interface information may include information regarding all possible interfaces in the network environment that are supported by all the devices in the device type sections. The hardware interface information may also include interface type, and label.

The WAN/VIC interface card information may include information regarding network cards, such as all WAN and VIC cards that are specified in the network module information section of the database. The WAN/VIC interface card information may include the model, device type, hardware interface information (such as what interface's are included), a software version which may be required to support the hardware interface (such as a minimum software version required for that hardware).

The network module information may include information regarding all network modules in the network environment that are specified in the modular device section of the device database. The network module information may also include information regarding the model, device type, whether WAN or VIC interface cards can be supported, whether there are any fixed hardware interface configuration, number of slots within a module, and minimum software version required for that hardware.

Figure 5:
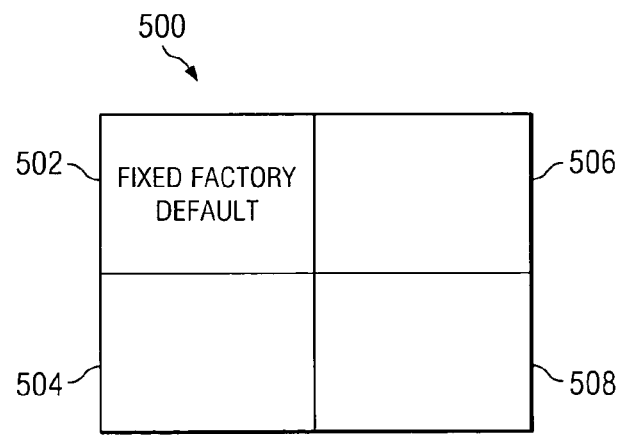
FIG. 5 is a block diagram of a modular device.

The fixed device information may include information regarding all devices that have a fixed configuration. For example, FIG. 5 shows an example of a device 500 with a fixed factory default 502 which is a fixed configuration and typically not user configurable, whereas sections 504, 506 and 508 are modular, which are not fixed configurations. The fixed device information may also include model, device type, fixed hardware interface information, and minimum software version required to support that hardware.

Modular device information may include information regarding all modular devices located in the network environment. Modular devices can be customized to meet the user's requirement as opposed to fixed devices. The modular device information may also include model, device type, number of slots within the device, supported network module .list from the network module information section of the database, fixed network module information, and minimum software version required for supporting that hardware.

Stacks information may identify devices in the network which are stacked. Stacked devices may be modular devices, fixed devices, or a combination of modular and fixed devices. An example of a stacked device is the stacked device 500 shown in FIG. 5, wherein device 502 is a fixed device and devices 504, 506 and 508 are modular devices, all of which are considered stacked devices due to their physical orientation with respect to each other. The stacks information may also include model, device type, number of slots, supported fixed and module device list, factory default fixed device list, and minimum software version required for supporting the hardware.

After referring to the device database for the device model type, via step 308, it is then determined whether the device database lookup was a success, via step 310. If the database lookup was not a success, then an error message is displayed, via step 320. If, however, the database lookup was a success, via step 310, then FIG. 3B is referred.

It is determined whether the device is a modular device, via step 312. If the device is a modular device, then information such as network module(s), WAN interface card(s), and I or voice interface card(s) is read from the device, via step 313. Device database is accessed for the learned hardware components, via step 314. If the database access was not a success, then an error message is displayed. If, however, the database lookup was a success, then information regarding the running software (operating system (OS)) of the device is learned, via step 322. Information regarding the running software may include the software version, size of the OS, name of the OS, feature set, and location of the running software on the device.

Figure 4:
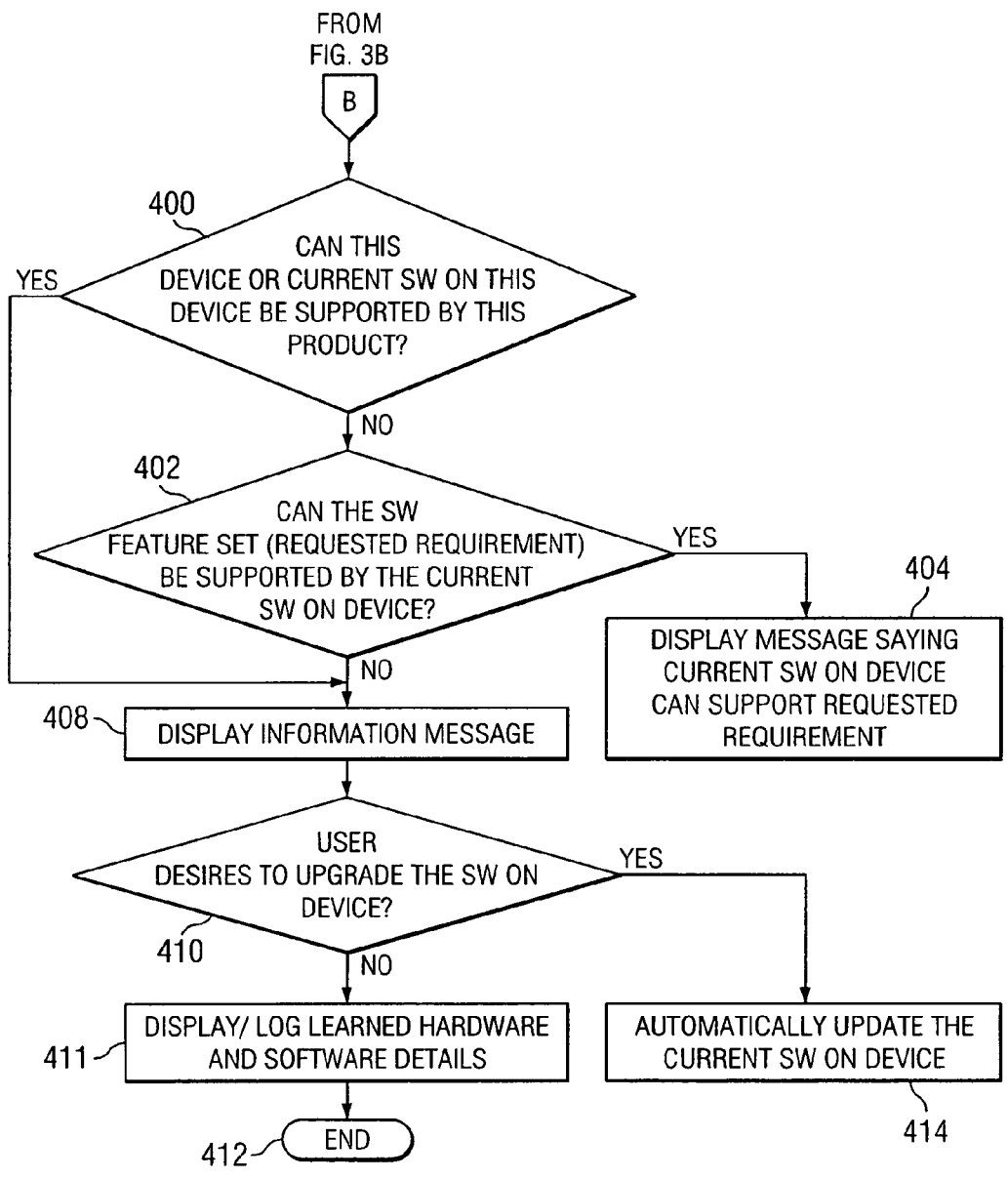
FIG. 4 is another flow diagram of a method according to an embodiment of the present Invention for interfacing with a component located in a network environment.

Thereafter, the method according an embodiment of the present invention for interfacing with a component located in a network environment of FIG. 4 may be referenced. The method exemplified in FIGS. 3A-3B is not product specific, that is the method shown in FIGS. 3A-3B can be utilized regardless of whether the user wishes to use a product. For instance, the method shown in FIGS. 3A-3B may be utilized by a network administrator for inventory purposes. The method shown in FIGS. 3A-3B in combination with the method shown in FIG. 4 may be used by a user wishing to utilize a product wherein the user is initially uncertain of whether the specified device may be supported by the product.

After learning information regarding the device and device software, via steps 314 or 322 of FIG. 3B, it is then determined whether the device or current software on the device can be supported by the product which the user wishes to use, via step 400. If the device or software can be supported by this product, then an informational message can be displayed, via step 408.

If, however, this device or software can not be supported by this product, via step 400, then it is determined whether the software feature set can be supported by the current software on the device, via step 402. The software feature set includes the requirement or requirements requested via the product which the user wishes to use. If the software feature set can be supported by the current software on the device, via step 402, then a message may be displayed stating that current software on the device can support the requested requirement, via step 404.

If the software feature set can not be supported by the current software on the device, via step 402, then an informational message can be displayed, via step 408. For example, the informational message may indicate to the user that the current software on the device is incompatible with the product the user wishes to use. The informational message may also allow the user the option to upgrade the software on the device in order to accommodate the product.

It is then determined whether the user wishes to upgrade the software on the device, via step 410. If the user does not wish to upgrade the software on the device, then the learned hardware and software details are displayed and/or logged. The program is then ended, via step 412. If, however, the user wishes to upgrade the software on the device, via step 410, then the current software on the device is automatically updated, via step 414. Facilitation of automatic update of the software can be accomplished by utilizing conventionally available programs such as Cisco Router Software Loader, or Cisco Resource Manager.

Figure 6:
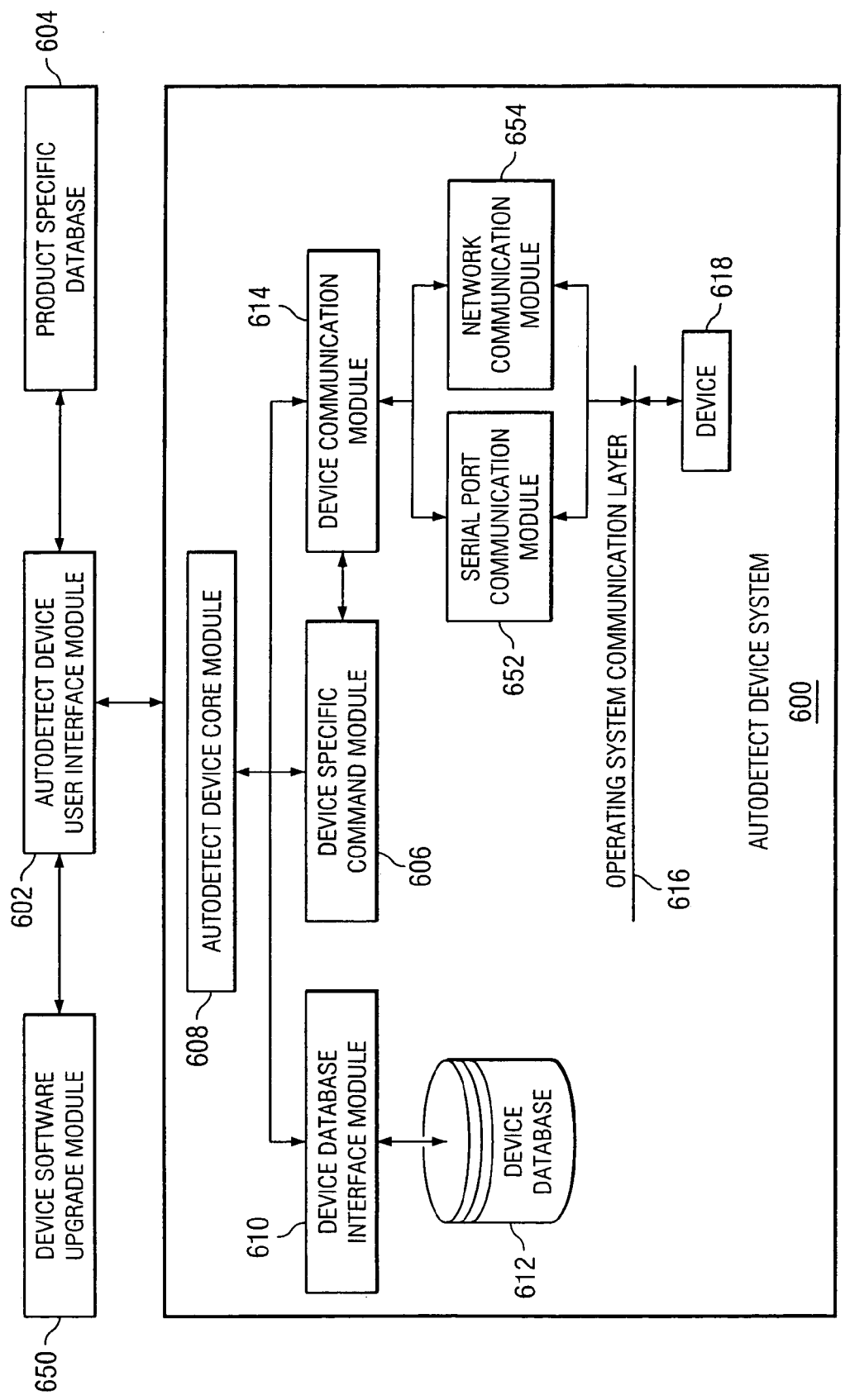
FIG. 6 is a block diagram of a system according to an embodiment of the present invention for interfacing with a component located in an network environment.

FIG. 6 is a block diagram of a system according to an embodiment of the present invention for interfacing with a component located in a network environment. An automatic detection (extension) user interface 602 is shown to be coupled with a product specific database 604 and an automatic detection system 600. The automatic detection user interface 602 may include user interface means, such as a keyboard, a pointer device such as a mouse, a display, a remote control, a voice interactive system, or any other device or software which may accommodate system interface with a user. The automatic detection system 600 is shown to include an auto detect device core module 608 which is shown to be coupled with a device specific command module 606 as well as device communication module 614, and a hardware database module 610. The hardware database module 610 is shown to be coupled with a device database 612. The device communication module 614 is shown to be coupled with a network/serial communication layer 616, which in turn is shown to be coupled to a device 618 within the network.

The auto detect device core module 608 performs the method steps exemplified in FIGS. 3 and 4. The device specific commands module 606 runs device specific commands to learn further information regarding the device once the device type is known. For example, the device specific commands module 606 can learn software information, such as version, size, location, feature set, and hardware information such as whether the device includes network modules, WAN interface cards, and VICs.

The device database module 610 interacts with the device database 612. Device database modules 610 are well known in the art. The device database 612 may be implemented in virtually any database format. One example of such a format is to use a flat file mechanism. Details of the device database 612 have previously been discussed in conjunction with the method exemplified in the flow diagram of FIG. 3.

The device communication module 614 handles all communication to and from device 618. Device communication modules 614 are also well known in the art. The device 616 may be any device located within the network which is being accessed by the user via the network/serial communication layer 616.

The product specific database 604 is a database which can be accessed by the method exemplified in the flow diagram of FIG. 4 in order to determine whether the device or software can be supported by a particular product, such as the determination of step 400 of FIG. 4. Additionally, the product specific database 604 can also be accessed to determine whether the software feature set can be supported by the current software on the device, such as the determination of step 402 of FIG. 4. The product specific database 604 may be provided by the product manufacturer, or the information regarding each product which may be utilized by a user in the network, such as information regarding what devices are supported by each product and what software version is required for each device, may be collected and stored by a network administrator.

A method and system for interfacing with a component located in a network environment has been disclosed. Software written according to the present invention may be stored in some form of computer-readable medium, such as memory or CD-ROM, or transmitted over a network, and executed by a processor.

Although the present invention has been described in accordance with the embodiment shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed is:

1. An apparatus, comprising:
a first component comprising at least hardware, the first component operable to:
automatically identify a second component by reading a device model identifier from the second component upon having a connection established with the second component, the second component comprising hardware;
retrieve information associated with the second component from a device database, the information associated with the second component comprising network module information describing a plurality of modular devices;
determine whether the second component is a modular device according to the network module information and the device module identifier;
if the second component is a modular device having the customizable configuration:
learn interface card information from the second component, the interface card information describing an interface card; and
look up the interface card in the device database storing information about a plurality of possible interface cards;
learn operating system information of an operating system of the second component;
determine if the second component includes software that is capable of supporting a function selected by the user of the first component;
if the first component determines that the second component includes software that is capable of supporting the function selected by the user, displaying an informational message to the user that conveys to the user that the second component is capable of supporting the function; and
if the first component determines that the second component includes software that is incapable of supporting the function selected by the user, initiating an upgrade of existing software for the second component in order to provide the selected function.

2. The apparatus of claim 1, wherein the first component is operable to query the second component as to whether the second component includes software that can support a function selected by a user of the first component.

3. The apparatus of claim 1, wherein the information associated with the second component relates to a software characteristic, the software characteristic being a selected one of a group of software characteristics consisting of:
 a) a software version number;
 b) a software size;
 c) a software filename; and
 d) a software feature set.

4. The apparatus of claim 1, wherein the information associated with the second component relates to a hardware characteristic, the hardware characteristic being a selected one of a group of hardware characteristics consisting of:
 a) device type information;
 b) device family information;
 c) hardware interface information;
 d) wide area network information;
 e) network module information;
 f) fixed device information;
 g) modular device information;
 h) voice interface card information; and
 i) stack information.

5. The apparatus of claim 1, further comprising:
a network interface coupled to the first component and operable to facilitate a data exchange between the first and the second component.

6. The apparatus of claim 1, wherein the first component is operable to access the device database in order to identify a correlation between the information associated with the second component and a data segment provided in the device database.

7. The apparatus of claim 1, wherein the information associated with the second component reveals whether the first component can interface with the second component in terms of a selected one of a feature set and a task to be performed by the first component.

8. A method for interfacing in a network environment, comprising:
automatically identifying, by a device comprising hardware, a component by reading a device model identifier from the component upon having a connection established between the device and the component;
retrieving information associated with the component from a device database, the information associated with the component comprising network module information describing a plurality of modular devices;
determining whether the component is a modular device according to the network module information and the device module identifier;
if the component is a modular device:
learning interface card information from the component, the interface card information describing an interface card; and
looking up the interface card in the device database storing information about a plurality of possible interface cards;
learning operating system information of an operating system of the component;
identifying if the component includes software that is incapable of supporting a function selected by the user;
if the component includes software that is incapable of supporting the function selected by the user, initiating an upgrade of existing software for the component; and
if the component includes software that is capable of supporting the function selected by the user, displaying an informational message to the user that conveys to the user that the second component is capable of supporting the function.

9. The method of claim 8, further comprising:
quering the component as to whether the component includes software that can support a function selected by a user.

10. The method of claim 8, wherein the information associated with the component relates to a software characteristic, the software characteristic being a selected one of a group of software characteristics consisting of:
a) a software version number;
b) a software size;
c) a software filename; and
d) a software feature set.

11. The method of claim 8, wherein the information associated with the component relates to a hardware characteristic, the hardware characteristic being a selected one of a group of hardware characteristics consisting of:
a) device type information;
b) device family information;
c) hardware interface information;
d) wide area network information;
e) network module information;
f) fixed device information;
g) modular device information;
h) voice interface card information; and
i) stack information.

12. The method of claim 8, further comprising:
facilitating a data exchange between the component and an origin of the request.

13. The method of claim 8, further comprising:
accessing the device database in order to identify a correlation between the information associated with the component and a data segment provided in the device database, the correlation providing a characteristic associated with the component.

14. The method of claim 8, wherein the information associated with the component reveals whether the component can interface with an additional component in terms of a selected one of a feature set and a task to be performed by a user.

15. A system for interfacing in a network environment, comprising:
means for automatically identifying, by a device comprising hardware, a component by reading a device model identifier from the component upon having a connection established between the device and the component;
means for retrieving information associated with the component from a device database, the information associated with the component comprising network module information describing a plurality of modular devices;
means for determining whether the component is a modular device according to the network module information and the device module identifier;
means for, if the component is a modular device:
learning interface card information from the component, the interface card information describing an interface card; and
looking up the interface card in the device database storing information about a plurality of possible interface cards;
means for learning operating system information of an operating system of the component;
means for identifying if the component includes software that is incapable of supporting a function selected by the user;
if the component includes software that is incapable of supporting the function selected by the user, means for initiating an upgrade of existing software for the component; and
if the component includes software that is capable of supporting the function selected by the user, means for displaying an informational message to the user that conveys to the user that the second component is capable of supporting the function.

16. The system of claim 15, further comprising:
means for querying the component as to whether the component includes software that can support a function selected by a user.

17. The system of claim 15, further comprising:
means for facilitating a data exchange between the component and an origin of the request.

18. The system of claim 15, further comprising:
means for accessing the device database in order to identify a correlation between the information associated with the component and a data segment provided in the device database, the correlation providing a characteristic associated with the component.

19. A non-transitory computer readable storage medium comprising software for interfacing in a network environment, the software when executed is operable to:
automatically identify a component by reading a device model identifier from the component upon having a connection established between a device and the component;
retrieve information associated with the component from a device database, the information associated with the component comprising network module information describing a plurality of modular devices;
determine whether the component is a modular device according to the network module information and the device module identifier;
if the component is a modular device:
learn interface card information from the component, the interface card information describing an interface card; and
look up the interface card in the device database storing information about a plurality of possible interface cards;
learn operating system information of an operating system of the component;
identify if the component includes software that is incapable of supporting a function selected by the user;
if the component includes software that is incapable of supporting the function selected by the user, initiate an upgrade of existing software for the component; and
if the component includes software that is capable of supporting the function selected by the user, displaying an informational message to the user that conveys to the user that the second component is capable of supporting the function.

20. The medium of claim 19, wherein the code is further operable to:
query the component as to whether the component includes software that can support a function selected by a user.

21. The medium of claim 19, wherein the code is further operable to:
facilitate a data exchange between the component and an origin of the request.

22. The medium of claim 19, wherein the code is further operable to:
access the device database in order to identify a correlation between the information associated with the component and a data segment provided in the device database, the correlation providing a characteristic associated with the component.

23. An apparatus, comprising:
a first component comprising at least hardware, the first component operable to:
    automatically identify a second component by reading a device model identifier from the second component upon having a connection established with the second component, the second component comprising hardware;
    retrieve information associated with the second component from a device database, the information associated with the second component comprising network module information describing a plurality of modular devices;
    determine whether the second component is a modular device according to the network module information and the device module identifier;
    if the second component is a modular device having the customizable configuration:
        learn interface card information from the second component, the interface card information describing an interface card; and
        look up the interface card in the device database storing information about a plurality of possible interface cards;
    learn operating system information of an operating system of the second component;
    determine if the second component includes software that is capable of supporting a product selected by the user;
    if the first component determines that the second component includes software that is capable of supporting the product selected by the user, displaying an informational message to the user that conveys to the user that the second component is capable of supporting the product; and
    if the first component determines that the second component includes software that is incapable of supporting the product selected by the user, initiating an upgrade of existing software for the second component in order to provide the selected function.

24. A method for interfacing in a network environment, comprising:
    automatically identifying, by a device comprising hardware, a component by reading a device model identifier from the component upon having a connection established between the device and the component;
    retrieving information associated with the component from a device database, the information associated with the component comprising network module information describing a plurality of modular devices;
    determining whether the component is a modular device according to the network module information and the device module identifier;
    if the component is a modular device:
        learning interface card information from the component, the interface card information describing an interface card; and
        looking up the interface card in the device database storing information about a plurality of possible interface cards;
    learning operating system information of an operating system of the component;
    determining if the second component includes software that is capable of supporting a product selected by the user;
    if the first component determines that the second component includes software that is capable of supporting the product selected by the user, display an informational message to the user that conveys to the user that the second component is capable of supporting the product; and
    if the first component determines that the second component includes software that is incapable of supporting the product selected by the user, initiate an upgrade of existing software for the second component in order to provide the selected function.

25. A system for interfacing in a network environment, comprising:
    means for automatically identifying, by a device comprising hardware, a component by reading a device model identifier from the component upon having a connection established between the device and the component;
    means for retrieving information associated with the component from a device database, the information associated with the component comprising network module information describing a plurality of modular devices;
    means for determining whether the component is a modular device according to the network module information and the device module identifier;
    means for, if the component is a modular device:
        learning interface card information from the component, the interface card information describing an interface card; and
        looking up the interface card in the device database storing information about a plurality of possible interface cards;
    means for learning operating system information of an operating system of the component;
    means for determining if the second component includes software that is capable of supporting a product selected by the user;
    if the first component determines that the second component includes software that is capable of supporting the product selected by the user, means for displaying an informational message to the user that conveys to the user that the second component is capable of supporting the product; and
    if the first component determines that the second component includes software that is incapable of supporting the product selected by the user, means for initiating an upgrade of existing software for the second component in order to provide the selected function.

26. A non-transitory computer readable storage medium comprising software for interfacing in a network environment, the software when executed is operable to:
    automatically identify a component by reading a device model identifier from the component upon having a connection established between a device and the component;
    retrieve information associated with the component from a device database, the information associated with the component comprising network module information describing a plurality of modular devices;
    determine whether the component is a modular device according to the network module information and the device module identifier;
    if the component is a modular device:
        learn interface card information from the component, the interface card information describing an interface card; and look up the interface card in the device database storing information about a plurality of possible interface cards;

learn operating system information of an operating system of the component;

determine if the second component includes software that is capable of supporting a product selected by the user;

if the first component determines that the second component includes software that is capable of supporting the product selected by the user, displaying an informational message to the user that conveys to the user that the second component is capable of supporting the product; and if the first component determines that the second component includes software that is incapable of supporting the product selected by the user, initiating an upgrade of existing software for the second component in order to provide the selected function.

* * * * *